(12) United States Patent
Kirschenbaum et al.

(10) Patent No.: US 7,016,143 B2
(45) Date of Patent: Mar. 21, 2006

(54) UTILIZATION OF TAPE HEAD ELECTRONIC LAPPING GUIDES (ELG'S) AS SERVO FORMAT VERIFIERS

(75) Inventors: Leif Stefan Kirschenbaum, San Francisco, CA (US); Mark Allen Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 10/886,493

(22) Filed: Jul. 7, 2004

(65) Prior Publication Data

US 2006/0007579 A1    Jan. 12, 2006

(51) Int. Cl.
*G11B 5/584* (2006.01)

(52) U.S. Cl. .................. 360/77.12; 360/46; 29/603.09; 29/603.16; 451/8; 451/5; 451/9

(58) Field of Classification Search ..................... None
See application file for complete search history.

(56) References Cited

U.S. PATENT DOCUMENTS

| 5,210,667 A | * | 5/1993 | Zammit ...................... 360/316 |
|---|---|---|---|
| 5,361,547 A | * | 11/1994 | Church et al. ................. 451/5 |
| 5,905,613 A | | 5/1999 | Biskeborn et al. ...... 360/130.21 |
| 6,031,673 A | * | 2/2000 | Fasen et al. ................... 360/53 |
| 6,462,904 B1 | * | 10/2002 | Albrecht et al. ............ 360/122 |
| 6,623,330 B1 | * | 9/2003 | Fukuroi ......................... 451/5 |
| 6,685,050 B1 | * | 2/2004 | Schmidt et al. ............... 221/48 |
| 2003/0214745 A1 | | 11/2003 | Lau .............................. 360/69 |
| 2005/0128638 A1 | * | 6/2005 | Koeppe et al. ............. 360/125 |

OTHER PUBLICATIONS

IBM Technical Disclosure Bulletin, "Re-Recordable Servo System for Multi-Track Tape," Jul. 1982, pp 778-779, https://www.delphion.com.

* cited by examiner

*Primary Examiner*—David Hudspeth
*Assistant Examiner*—Dismery Mercedes
(74) *Attorney, Agent, or Firm*—Zilka-Kotab, PC

(57) ABSTRACT

The present invention uses Electronic Lapping Guides (ELG's), which are patterned on every tape head, as servo format verifiers. This is implemented by specifically placing the ELG's at the appropriate locations to match the servo signal track locations and thus be usable to verify the servo format patterns on the formatted tape. According to another aspect of the present invention, tape head components which have faulty read sensors, servo sensors, or write elements which have valid ELG's may be used for the servo format verification purpose.

22 Claims, 5 Drawing Sheets

UTILIZATION OF TAPE HEAD ELECTRONIC LAPPING GUIDES (ELG'S) AS SERVO FORMAT VERIFIERS

FIELD OF THE INVENTION

The present invention relates to systems and methods for servo verification, and more particularly, this invention relates to utilization of tape head Electronic Lapping Guides (ELGs) as servo format verifiers.

BACKGROUND OF THE INVENTION

The recording and reading of data in tracks on magnetic storage media requires precise positioning of magnetic read/write heads. The read/write heads must be quickly moved to, and maintained centered over, particular data tracks as recording and reading of data takes place. The magnetic heads can record and read data as relative movement occurs between the heads and the magnetic storage media in a transducing direction. The heads are moved from track to track across the width of the tracks in a translating direction, which is perpendicular to the transducing direction.

For example, a recordable disk typically contains concentric data tracks and is rotated beneath a magnetic head. The direction of rotation defines the transducing direction. Radial movement from track to track defines the translating direction. A magnetic tape typically contains data tracks that extend along the length of the tape, parallel to the tape edges, in the transducing direction. In magnetic tape helical scan systems, however, the tape is moved beneath heads that are moved at an angle across the width of the tape, the diagonal direction defining the transducing direction.

Storage devices that read and record data on magnetic media typically use servo control systems to properly position the data heads in the translating direction. The servo control systems derive a position signal from a servo magnetic head that reads servo control information recorded in servo tracks on the storage media. Sometimes, the servo control information comprises two parallel but dissimilar patterns flanking data tracks.

FIG. 1 illustrates a typical multitrack tape head 100 having a multitude of read elements 102 and one or more servo sensors 104, where the servo sensors 104 are spaced such as to read two servo format bands on tape media during tape drive operation for the purposes of timing based servo.

Because most tape drives in service are not capable of writing servo information on magnetic tape media, such tapes are sold with servo format patterns already created on the tape surface. Manufacturers of tapes use a high speed formatting head to write servo information on the tapes. However, if part of that head fails, the servo information may not be written correctly and may even be missing. The result is that the tape may be only partially usable or even completely useless to the end consumer. Thus, it is often necessary to verify that a servo format pattern has been properly written on the tape because, as mentioned above, most tape drives in service today do not have the capability to write or repair servo track data.

One solution is to specifically design, develop, and fabricate a thin film head specifically tailored to the servo format verification process as described in U.S. Pat. No. 6,462,904 entitled "Timing Based Servo for Magnetic Tape Systems" and which is herein incorporated by reference. However, this requires thin film development and fabrication effort specific to this purpose, which can be quite costly due to wafer design and fabrication costs (e.g., the need to create multiple masks, perform photolithography, etc.) in order to form a head that, unlike standard heads which read only a portion of the tape, e.g., ¼ or ⅛ of the tape width, can read all of the servo tracks simultaneously. Because servo format verification heads are not needed in bulk, the cost per unit produced would be prohibitive.

Another solution for servo verification is to utilize a standard tape head's servo sensors to verify the servo format patterns. However, standard tape heads typically have only one or two servo sensors, so this solution is only capable of monitoring two bands of the servo format at a time, when in fact, a greater number, such as five, bands of servo format are written during the tape manufacturing process. Thus, either several read heads must be simultaneously employed, or the read head must be shifted back and forth across the width of the tape to sequentially read the various servo tracks.

Therefore it would be useful to construct low cost servo format read heads with the capability of reading all the servo format bands, such as five, at the same time.

SUMMARY OF THE INVENTION

The present invention uses Electronic Lapping Guides (ELG's), which are commonly patterned on every tape head, as servo format verifiers. This is implemented by specifically placing the ELG's at the appropriate locations to match the servo signal track locations and thus be usable to verify the servo format patterns on the formatted tape.

According to another aspect of the present invention, tape head components which have faulty read sensors, servo sensors, or write elements which have valid ELG's may be used for the servo format verification purpose.

Several advantages provided by the present invention are:

Scrap parts from tape head component manufacturing may be re-used as servo format verifiers;

No thin-film wafer fabrication process need be dedicated to the production of servo format verifiers;

No thin-film post-wafer fabrication (lapping, grinding, polishing, etc.) need be dedicated to the production of servo format verifiers;

Well-known fabrication processes which have been optimized to the production of tape head read tracks would produce the ELG sensors.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Multitrack tape heads usually have Electronic Lapping Guides (ELGs) patterned on them. During head fabrication, the head is lapped down to its designed stripe height. In order for the lapping tool to know when it has reached its targeted stripe height, the lapping system measures the resistance of ELGs placed at the top and bottom ends of the head, fairly distant from the active read and write elements. There are typically a multitude of lapping guides provided, such as described in U.S. Pat. No. 5,361,547 "Ultimate Inductive Head Integrated Lapping System", which is herein incorporated by reference. The present disclosure seeks to provide new and novel heads that use ELGs for servo track format verification.

Figure 1:
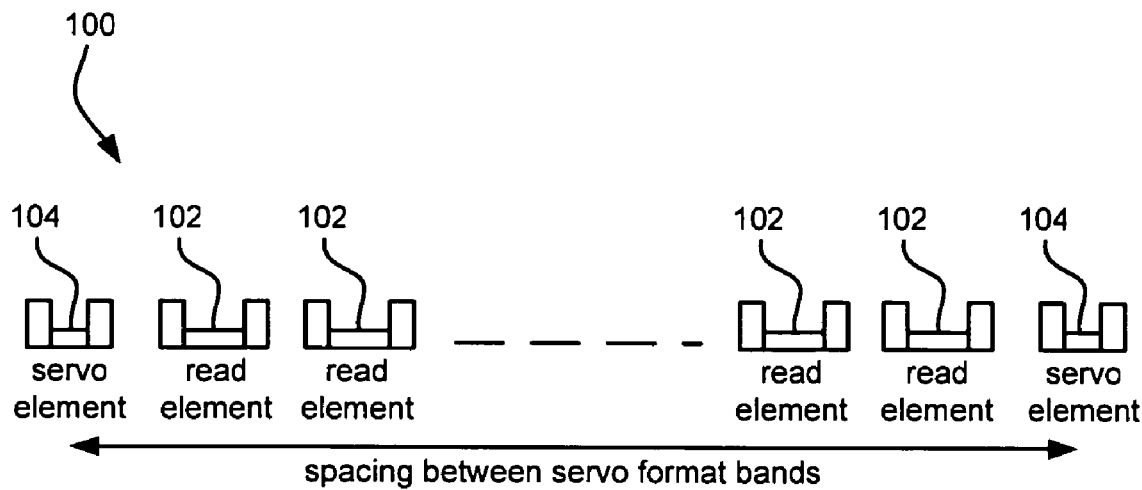
FIG. 1 is a representative view of a typical multitrack tape head having a multitude of read elements and one or more servo sensors.
Figure 2:
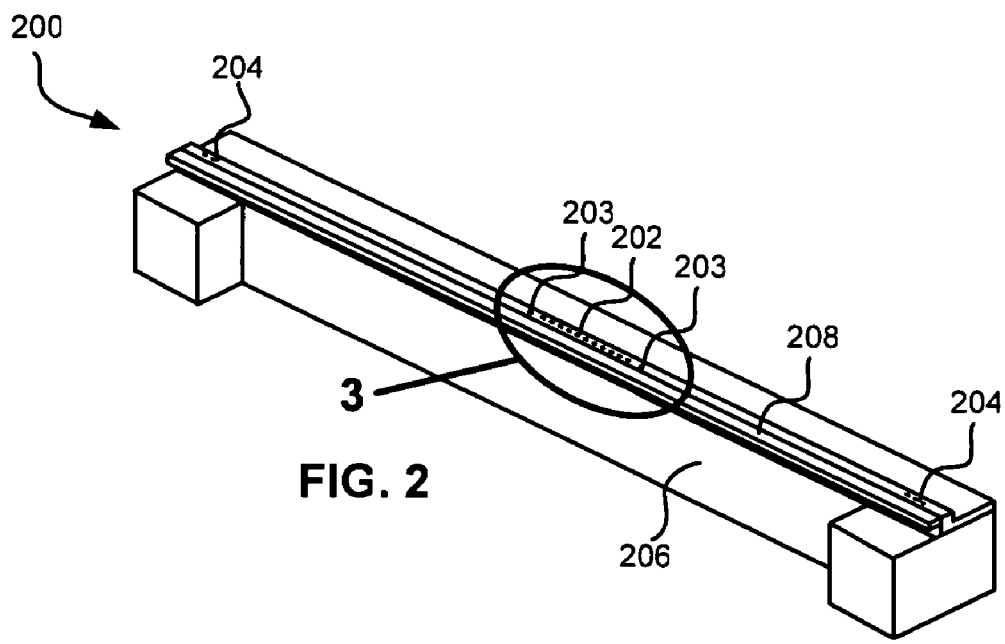
FIG. 2 illustrates a module portion of a tape head.
Figure 3:
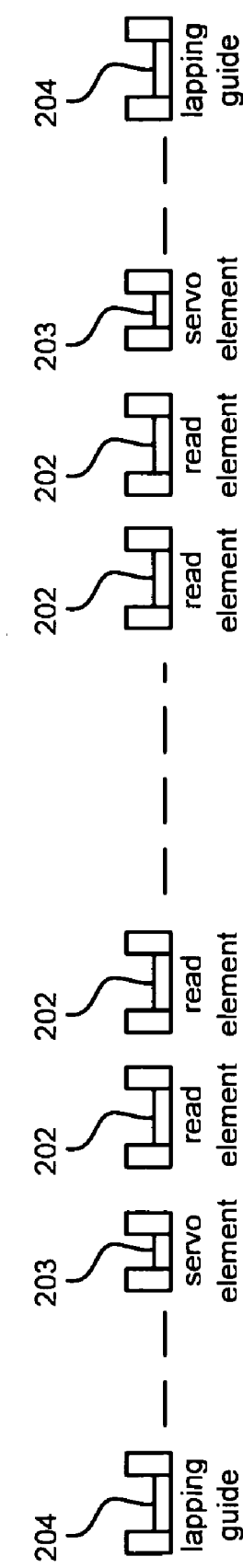
FIG. 3 is a representative view of the read and/or write elements, servo sensors, and the ELGs of the module of FIG. 2 taken from Circle 3 of FIG. 2.

FIG. 2 illustrates a module 200 after the lapping thereof and the attachment of a U-beam thereto. As shown, the read sensors and/or write elements 202 are positioned towards the middle of the module 200, servo sensors 203 flank the elements 202, and the ELGs 204 are positioned towards opposite ends of the head 200. FIG. 3 is a representative view of the read sensors and/or write elements 202, servo sensors 203, and the ELGs 204 of the module 200. In order to increase the stability of the module 200 for the suitable use thereof, the module 200 is attached to a beam 206 of some sort formed of a rigid material. Such beams 206 are often referred to as a "U-beams." A closure 208 is often attached in view of the benefits it affords in resultant heads.

Figure 4:
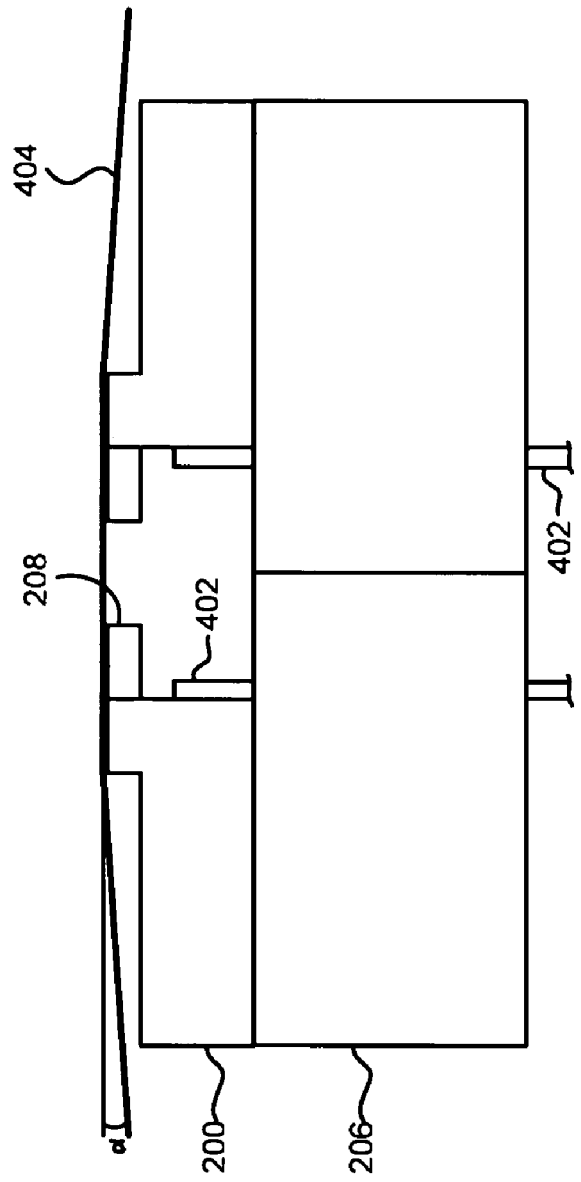
FIG. 4 illustrates a head for a read-while-write bidirectional linear tape drive in use.

FIG. 4 illustrates a head 400 for a read-while-write bidirectional linear tape drive in use. "Read-while-write" means that the read element follows behind the write element. This arrangement allows the data just written by the write element to be immediately checked for accuracy and true recording by the following read element.

The head 400 of FIG. 4 is formed by coupling two modules 200 of the type shown in FIG. 2. Specifically, in FIG. 4, two modules 200 are mounted on U-beams 206 which are, in turn, adhesively coupled. Cables 402 are fixedly coupled to the pads 204. The tape 404 wraps over the modules 200 at a predetermined wrap angle α.

It should be noted that the two-module tape head 400 of FIG. 4 is representative only, as the precepts of the present invention can be implemented in any type of head where multiple tracks of servo information can be read.

By artfully placing some of the ELGs 203 at the locations corresponding to the spacing of servo format tracks or "bands" on a tape, a multitrack tape head is provided with ELGs 203 acting as servo sensors in locations suitable for reading all the servo format tracks of the tape in a single pass.

Figure 5:
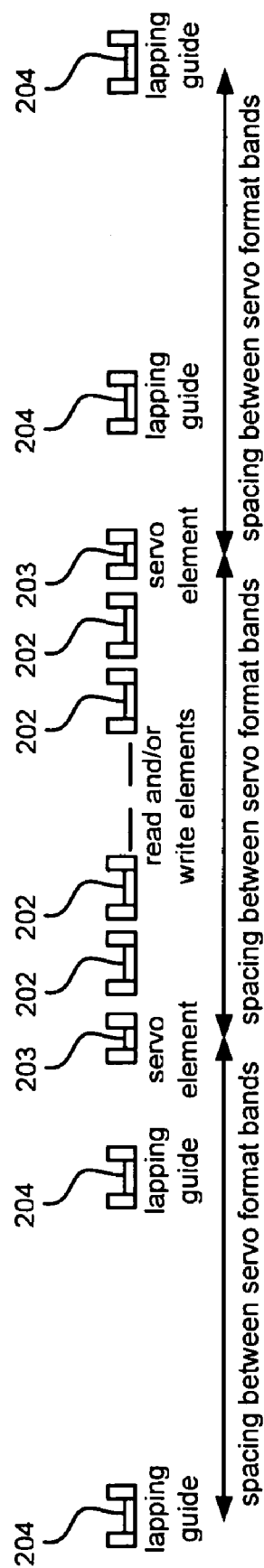
FIG. 5 is a representative view of read and/or write elements, servo sensors, and advantageously placed ELGs of an otherwise standard head capable of reading four servo tracks simultaneously.

FIG. 5 is a representative view of read and/or write elements 202, servo sensors 203, and advantageously placed ELGs 204 of an otherwise standard head 500 capable of reading four servo tracks simultaneously. The existing servo sensors 203 read two of the tracks, while the outer shown ELGs 204 read outer servo tracks. One skilled in the art will appreciate that additional ELGs can be added at appropriate locations to read additional servo tracks, and that the servo sensors 203 may also function as or have a structure similar to electronic lapping guides. The head 500 of FIG. 5 can then be used as a servo format verifier by a manufacturer of the tape.

Because ELGs are already being placed during fabrication, only their position need be selected. Thus, the cost to create these dual-purpose heads is about the same as the cost to produce standard heads.

An added benefit is that a tape drive implementing a head such as the head 500 shown in FIG. 5 can check all servo tracks of a tape during end user read and/or write operations. This would be particularly useful for a consumer who has sensitive data and wants to ensure that the servo tracks are present.

A preferred embodiment is one where the tape head components intended for use as servo format verifiers be assembled using the same process steps and parts as a tape head intended for use in a tape drive, as then no additional parts or assembly processes are required for manufacture of the servo format verifier heads other than specialized electrical attachment to the lapping guides, which are not normally electrically connected when the tape head is used in a tape drive.

Figure 6:
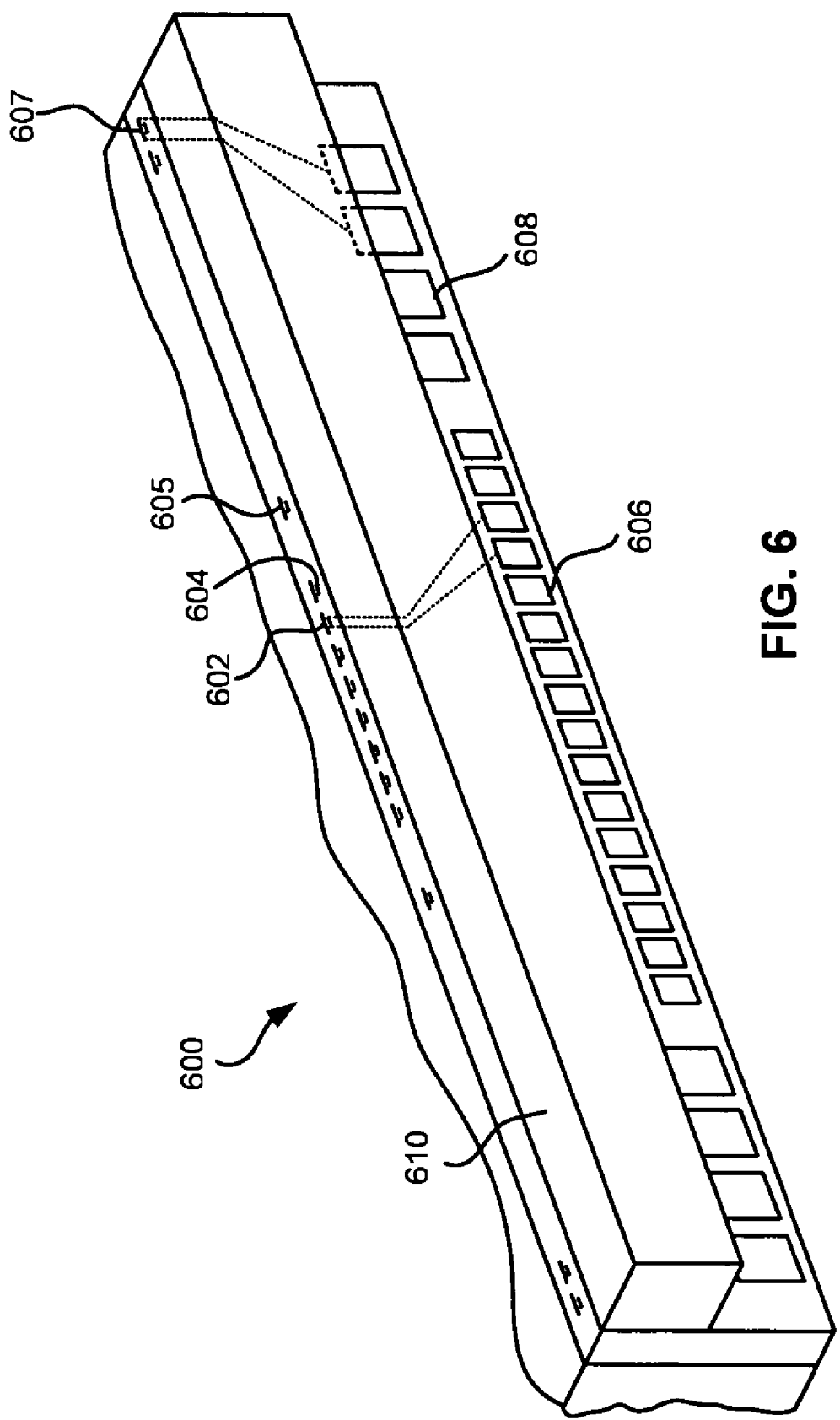
FIG. 6 illustrates an illustrative module that can be used to form the head of FIG. 5.

FIG. 6 illustrates an illustrative module 600 that can be used to form the head 500 of FIG. 5.

As shown in FIG. 6, the module 600 is formed with read and write elements 602, 604 and servo sensors 605 exposed on a tape bearing surface of the module 600, a portion of the module 600 acting as a substrate for the various components of the module 600. ELGs 607 are advantageously positioned to correspond to servo tracks of a tape usable therewith. Note also that additional ELGs 607 can also be positioned on the module 600 to read tapes having additional servo tracks. Contact pads 606 in communication with the elements 602, 604 via conductive straps are formed. A closure piece 610 extends from the inner face of the module 600.

An alternate embodiment for electrical connection to the lapping guides is to affix a cable such as is used for a tape head to the component to be used as a servo format verifier and then to make connection between this cable and the lapping guide contact pads, such as with wirebonding, to afford electrical connection to the lapping guides without the use of a specialized cable.

The heads described herein can be used in a servo verification process. As the servo sensors are reading servo information, the ELGs are also used to read the servo tracks that are being written. In this way, all of the servo bands that are being written can be verified during servo write using a standard head with the advantageously placed ELGs in conjunction with the existing servo sensors.

Figure 7:
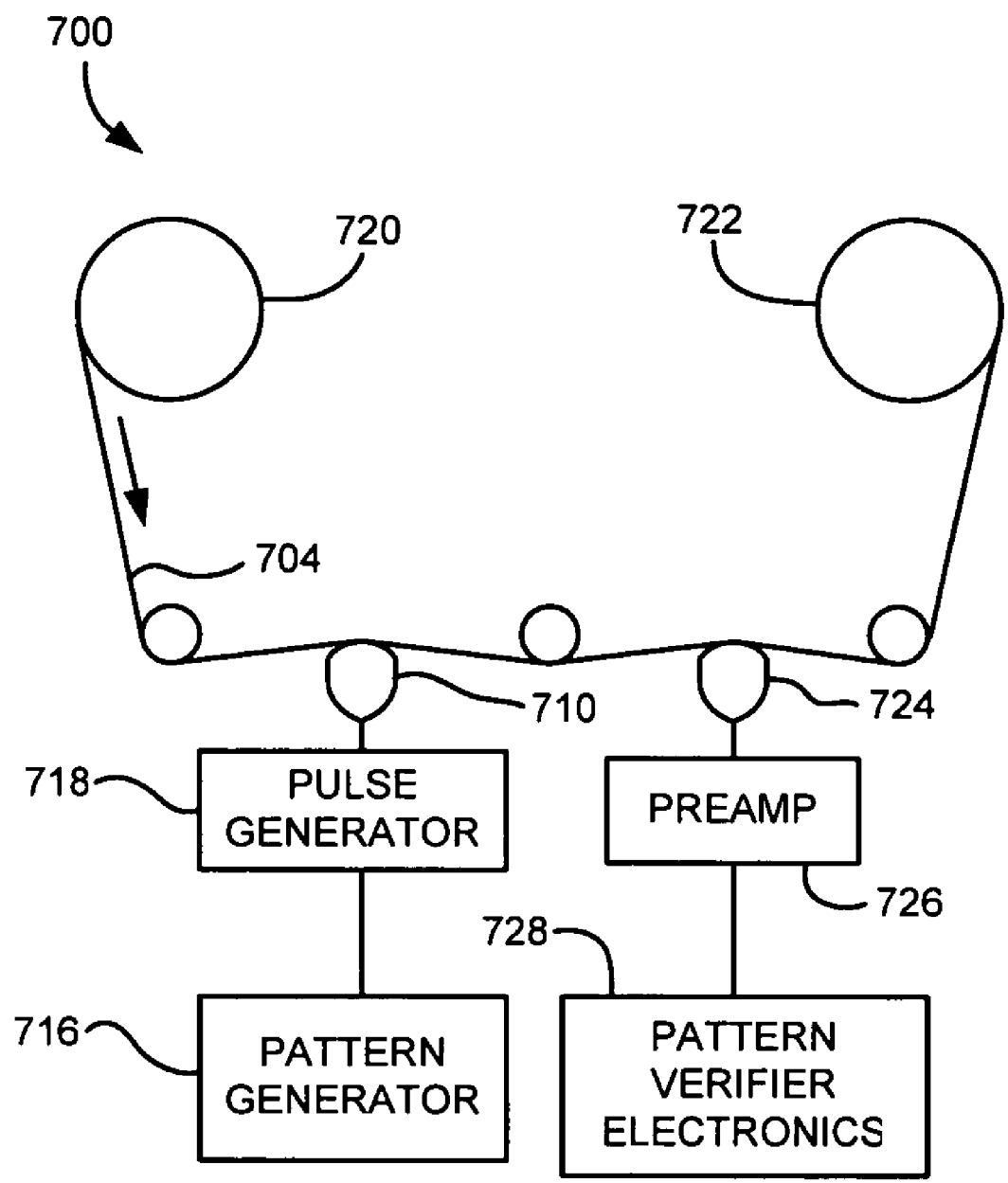
FIG. 7 is a schematic diagram of the tape writing system with simultaneous writing and verification of servo tracks.

FIG. 7 is a schematic diagram of the tape writing system 700 illustrating tape verification elements and showing that the tape 704 is passed from a supply reel 720 to a take-up reel 722 as the servo pattern is recorded onto the tape. The pattern generator 716 produces the pattern pulses, which are provided to the servo write head pulse generator 718 that intermittently energizes the write head 710. After the tape 704 is recorded with the servo pattern, the pattern must be verified to assure high quality. A servo verification head 724, as described above, reads the just-recorded servo pattern and provides a servo signal to a pre-amplifier 726. The pre-amplifier provides an amplified version of the servo signal to a pattern verifier 728 that performs a variety of verifying operations, such as checking the servo pattern, signal amplitude, dropout rate, and consistency of redundant servo tracks.

If it is desired to monitor each servo track with more than one verifying element, then a "two bump" verifier head may be constructed where the second bump (tape engaging portion such as one of the modules of FIG. 4) in the verifier head is offset from the first in order to obtain measures of a servo track at two lateral locations. The bumps can be offset, either by creating a slight offset between the modules, or by constructing a verifier head where the two bumps are aligned but then place the verifier in the tape path with a small azimuthal angle, e.g., by slightly rotating the completed head of aligned modules.

Alternatively, multiple servo verification elements (i.e., ELGs or servo sensors) may be placed at each location on a single module, allowing for a "one bump" verifier head to obtain two measures of a servo track. In this embodiment, groups of two or more servo verification elements would be positioned on the same module, the elements in each group being aligned or offset with respect to the direction of movement of the tape thereover.

In another embodiment, a head formed from opposing modules not only allows verification that servo tracks are present, but also provides information such as the speed of the tape. The speed of the tape is useful for diagnostics and quality control. If desired, the readers and ELGs can be staggered, either by creating a slight offset between the modules, or by slightly rotating the completed head of aligned modules.

Another aspect of the present invention provides a method for reusing otherwise unusable heads. If a head has a bad read or write element, current practice is to discard the head. Instead, an aspect of the present invention provides a use for such otherwise useless heads. Because a servo verification head as described above does not need to read or write data using data readers or writers, a malfunctioning head with advantageously placed ELGs can be sold to tape manufacturers or vendors as a servo format verifier capable of verifying all servo tracks simultaneously. Thus, rather than incur the cost of wafer design and fabrication costs for a few specialized servo format verification heads, heads that are being produced for other purposes, but with the advantageously placed ELGs, can be used.

Accordingly, multitrack tape head components which are unsuitable for operation in a tape drive, such as when one or more the read elements are faulty, may be contoured as flat (U.S. Pat. No. 5,905,613 "Bidirectional Flat Contour Linear Tape Recording Head and Drive") or contoured tape head components and assembled into a suitable form as to be utilized as servo format verifiers.

A preferred embodiment is one where multiple lapping guides are placed at locations corresponding to the spacing of the servo format bands affording a redundant number of servo format read elements. For example placement of four such lapping guides, which together with the two servo sensors thus would furnish six servo format read elements, where only five may be required, which thus allows use of such a tape head component by electrically connecting two lapping guides on one end, the two servo sensors, and only one lapping guide (the one closer to the servo sensor) on the other end.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A head adapted for operation with a magnetic medium having servo tracks, comprising:
   a plurality of elements selected from a group consisting of read sensors and write elements;
   a servo sensor positioned towards the elements, the servo sensor being adapted for sensing a first servo track of a magnetic medium; and
   an electronic lapping guide (ELG) spaced apart from the servo sensor at a distance such that when the servo sensor is adjacent the first servo track, the electronic lapping guide is adjacent a second servo track of the magnetic medium,
   wherein the electronic lapping guide is capable of sensing the second servo track.

2. The head as recited in claim 1, further comprising a second servo sensor adapted for sensing a third servo track.

3. The head as recited in claim 1, further comprising a second electronic lapping guide adapted for sensing a third servo track.

4. The head as recited in claim 1, further comprising at least one additional sensor selected from a group consisting of electronic lapping guides and servo sensors, a number of additional sensors being sufficient to read any servo tracks of the magnetic medium present in addition to the first and second servo tracks.

5. The head as recited in claim 4, wherein the magnetic medium has at least three servo tracks.

6. The head as recited in claim 4, wherein the magnetic medium has at least five servo tracks.

7. The head as recited in claim 1, wherein the servo sensor is also an electronic lapping guide.

8. The head as recited in claim 1, further comprising at least one redundant servo sensor for sensing the first servo track.

9. The head as recited in claim 8, wherein the redundant servo sensor is offset from the electronic lapping guide in a direction generally parallel to a direction of travel of the magnetic medium.

10. The head as recited in claim 8, wherein the redundant servo sensor is offset from the electronic lapping guide in a direction generally perpendicular to a direction of travel of the magnetic medium.

11. The head as recited in claim 8, wherein the redundant servo sensor is positioned on a same bump as the electronic lapping guide.

12. The head as recited in claim 8, wherein the redundant servo sensor is positioned on a different bump than the electronic lapping guide.

13. The head as recited in claim 1, further comprising at least one redundant electronic lapping guide for sensing the first servo track.

14. The head as recited in claim 13, wherein the redundant electronic lapping guide is offset from the electronic lapping guide in a direction generally parallel to a direction of travel of the magnetic medium.

15. The head as recited in claim 13, wherein the redundant electronic lapping guide is offset from the electronic lapping guide in a direction generally perpendicular to a direction of travel of the magnetic medium.

16. The head as recited in claim 13, wherein the redundant electronic lapping guide is positioned on a same bump as the electronic lapping guide.

17. The head as recited in claim 13, wherein the redundant electronic lapping guide is positioned on a different bump than the electronic lapping guide.

18. The head as recited in claim 1, wherein the magnetic medium is a magnetic tape.

19. The head as recited in claim 1, wherein at least one of the elements selected from the group consisting of read and write elements is inoperative.

20. A tape drive system, comprising:
a head having:
a plurality of elements selected from a group consisting of read and write elements;
multiple sensors selected from a group consisting of electronic lapping guides and servo sensors, the sensors being capable of sensing servo tracks of a magnetic recording tape, a number of sensors present being sufficient to read all servo tracks of the magnetic recording tape simultaneously;
a drive mechanism for passing the magnetic recording tape over the head; and
pattern verifier electronics for receiving data from the sensors.

21. The system as recited in claim 20, further comprising a write head for writing the servo tracks.

22. The system as recited in claim 21, wherein the servo tracks are written and verified simultaneously.

* * * * *